US009625169B2

United States Patent
Sakai et al.

(10) Patent No.: US 9,625,169 B2
(45) Date of Patent: Apr. 18, 2017

(54) HVAC CONTROLLER AND METHOD FOR OPERATING AN HVAC SYSTEM BASED ON A DIFFERENCE IN TEMPERATURE BETWEEN RETURN AIR AND SUPPLY AIR AND AN HVAC SYSTEM EMPLOYING THE CONTROLLER OR METHOD

(71) Applicant: LENNOX INDUSTRIES INC., Richardson, TX (US)

(72) Inventors: Takeshi Sakai, Carrollton, TX (US); Peter Hrejsa, Carrollton, TX (US)

(73) Assignee: Lennox Industries Inc., Richardson, TX (US)

(*) Notice: Subject to any disclaimer, the term of this patent is extended or adjusted under 35 U.S.C. 154(b) by 520 days.

(21) Appl. No.: 14/160,300

(22) Filed: Jan. 21, 2014

(65) Prior Publication Data

US 2015/0204567 A1    Jul. 23, 2015

(51) Int. Cl.
F24F 11/00     (2006.01)
F25B 49/02     (2006.01)
F24D 19/10     (2006.01)
F25B 13/00     (2006.01)

(52) U.S. Cl.
CPC ...... *F24F 11/0012* (2013.01); *F24D 19/1084* (2013.01); *F24F 11/0076* (2013.01); *F25B 49/02* (2013.01); *F25B 13/00* (2013.01); *F25B 2600/0253* (2013.01); *F25B 2600/112* (2013.01); *F25B 2700/21172* (2013.01); *F25B 2700/21173* (2013.01); *Y02B 30/741* (2013.01); *Y02B 30/743* (2013.01)

(58) Field of Classification Search
CPC . G05D 23/19; G05B 2219/2614; F25B 49/02; F25B 2600/0253; F25B 2600/112; F25B 2700/21172; F25B 2700/21173; F24F 11/0076

See application file for complete search history.

(56) References Cited

U.S. PATENT DOCUMENTS

| 4,240,579 | A | * | 12/1980 | Post | F24D 19/1009 236/10 |
|---|---|---|---|---|---|
| 5,369,597 | A | * | 11/1994 | Bujak, Jr. | F24D 19/1039 165/294 |
| 2002/0166659 | A1 | * | 11/2002 | Wagner | F24F 11/0012 165/254 |
| 2004/0238653 | A1 | * | 12/2004 | Alles | F24F 3/0442 236/49.3 |
| 2006/0185373 | A1 | * | 8/2006 | Butler | F24F 11/0009 62/181 |
| 2007/0012052 | A1 | * | 1/2007 | Butler | F24F 11/0009 62/181 |
| 2007/0131784 | A1 | * | 6/2007 | Garozzo | F24F 11/0009 236/51 |

(Continued)

*Primary Examiner* — Allana Lewin Bidder
*Assistant Examiner* — Kun Kai Ma
(74) *Attorney, Agent, or Firm* — Baker Botts L.L.P.

(57) ABSTRACT

The disclosure provides an HVAC system, an HVAC controller and a method of operating an HVAC system. In one embodiment, the HVAC controller includes: (1) an interface configured to receive a thermostat call and (2) a processor configured to initiate operation of the HVAC system in response to the thermostat call and control operation thereof based on a temperature difference across a conditioning unit of the HVAC system.

20 Claims, 2 Drawing Sheets

(56) References Cited

U.S. PATENT DOCUMENTS

| | | | |
|---|---|---|---|
| 2008/0000246 A1* | 1/2008 | Ha | F24F 11/008 62/228.1 |
| 2008/0315000 A1* | 12/2008 | Gorthala | B60H 1/00785 236/46 C |
| 2010/0070093 A1* | 3/2010 | Harrod | F24F 11/0086 700/278 |
| 2013/0240172 A1* | 9/2013 | Reilly | G05D 23/1931 165/11.1 |
| 2014/0000291 A1* | 1/2014 | Kates | F24F 3/1603 62/56 |

* cited by examiner

HVAC CONTROLLER AND METHOD FOR OPERATING AN HVAC SYSTEM BASED ON A DIFFERENCE IN TEMPERATURE BETWEEN RETURN AIR AND SUPPLY AIR AND AN HVAC SYSTEM EMPLOYING THE CONTROLLER OR METHOD

TECHNICAL FIELD

This application is directed, in general, to heating, ventilating and air conditioning (HVAC) systems and, more specifically, to directing the operation of HVAC systems.

BACKGROUND

HVAC systems can be used to regulate the environment within an enclosed space. Typically, a thermostat call initiates operation of an HVAC system that results in a circulation fan pulling air from the enclosed space into the HVAC system through ducts and pushing the air back into the enclosed space through additional ducts after conditioning the air (e.g., heating, cooling or dehumidification). Once the desired environmental condition is obtained within the enclosed space, such as a desired temperature, the HVAC system is turned off.

Some HVAC systems include modulating or two-stage compressors that can operate at different speeds compared to a single stage compressor that runs at one speed, i.e., full speed. The multi-stage compressors can operate more efficiently compared to conventional single stage compressors and reduce energy costs. HVAC systems may also include a multi-stage furnace that is operable at different heating capacities. Some HVAC systems can also include circulation fans that move air through the HVAC system at different volumes that can vary based on the operating mode (e.g., heating, cooling or dehumidification) and the requested compressor capacity or speed per the thermostat call.

In addition to multi-stage furnaces, variable-speed compressors and circulation fans, some HVAC systems also use zone controls. A zone controlled system allows a user to independently control the temperature in various designated zones of an enclosed space, such as a house. A zone control panel or zone controller manages the movement of conditioned air to the various zones using electronic dampers and thermostats dedicated to each of the zones. Harmony III™ Zone Control System available from Lennox Industries, Inc. of Richardson, Tex., is an example of a zoning system that manages the distribution of conditioned air to designated zones.

SUMMARY

In one aspect, the disclosure provides a controller of an HVAC system. In one embodiment, the HVAC controller includes: (1) an interface configured to receive a thermostat call and (2) a processor configured to initiate operation of the HVAC system in response to the thermostat call and control operation thereof based on a temperature difference across a conditioning unit of the HVAC system.

In yet another aspect, a method of operating an HVAC system is disclosed. In one embodiment, the method includes: (1) operating the HVAC system in response to a thermostat call, (2) determining a temperature difference across a conditioning unit of the HVAC system during the operating and (3) controlling the operating based on the temperature difference.

In still yet another aspect, the disclosure provides an HVAC system. In one embodiment, the HVAC system includes: (1) at least one conditioning unit, (2) a circulation fan configured to move air across the conditioning unit and (3) a controller configured to direct operation of the HVAC system, the controller having (3A) an interface configured to receive a thermostat call and (3B) a processor configured to initiate operation of the HVAC system in response to the thermostat call and control operation thereof based on a temperature difference across the conditioning unit.

BRIEF DESCRIPTION

Reference is now made to the following descriptions taken in conjunction with the accompanying drawings, in which.

DETAILED DESCRIPTION

Changing to the different operating stages of an HVAC system is often based on the supply air temperature, i.e., the temperature of the conditioned air provided to the enclosed space. It is realized herein that determining the operating stages for an HVAC system based on a single temperature can result in inefficient operation of the system. For example, the supply temperature for an HVAC system may indicate inadequate cooling and that the HVAC system should be operated at a higher stage. As such, the HVAC controller directs the variable-speed compressor, such as a modulating of multi-stage compressor, from a first operating stage to a second operating stage. The HVAC system, however, can already be cooling to its maximum capability and increasing the compressor speed would have little or no effect. As such, the compressor is inefficiently operated.

It is further realized herein that the efficiency of HVAC systems can be improved by controlling demand based on the temperature difference across the evaporator coils of the HVAC systems. Continuing the above example, the HVAC system may have a cooling capacity of 15 to 20 degrees and the supply air temperature is 65 degrees. If the return air temperature is 80 to 85 degrees, than the HVAC system is operating at its maximum capacity and increasing compressor speed will provide a minimum or no additional temperature drop across the evaporator coil. Accordingly, disclosed herein are various embodiments of a HVAC controller and method that direct the operation of an HVAC system based on the temperature difference across the evaporator coil instead of just a single operating temperature of the HVAC system.

Figure 1:
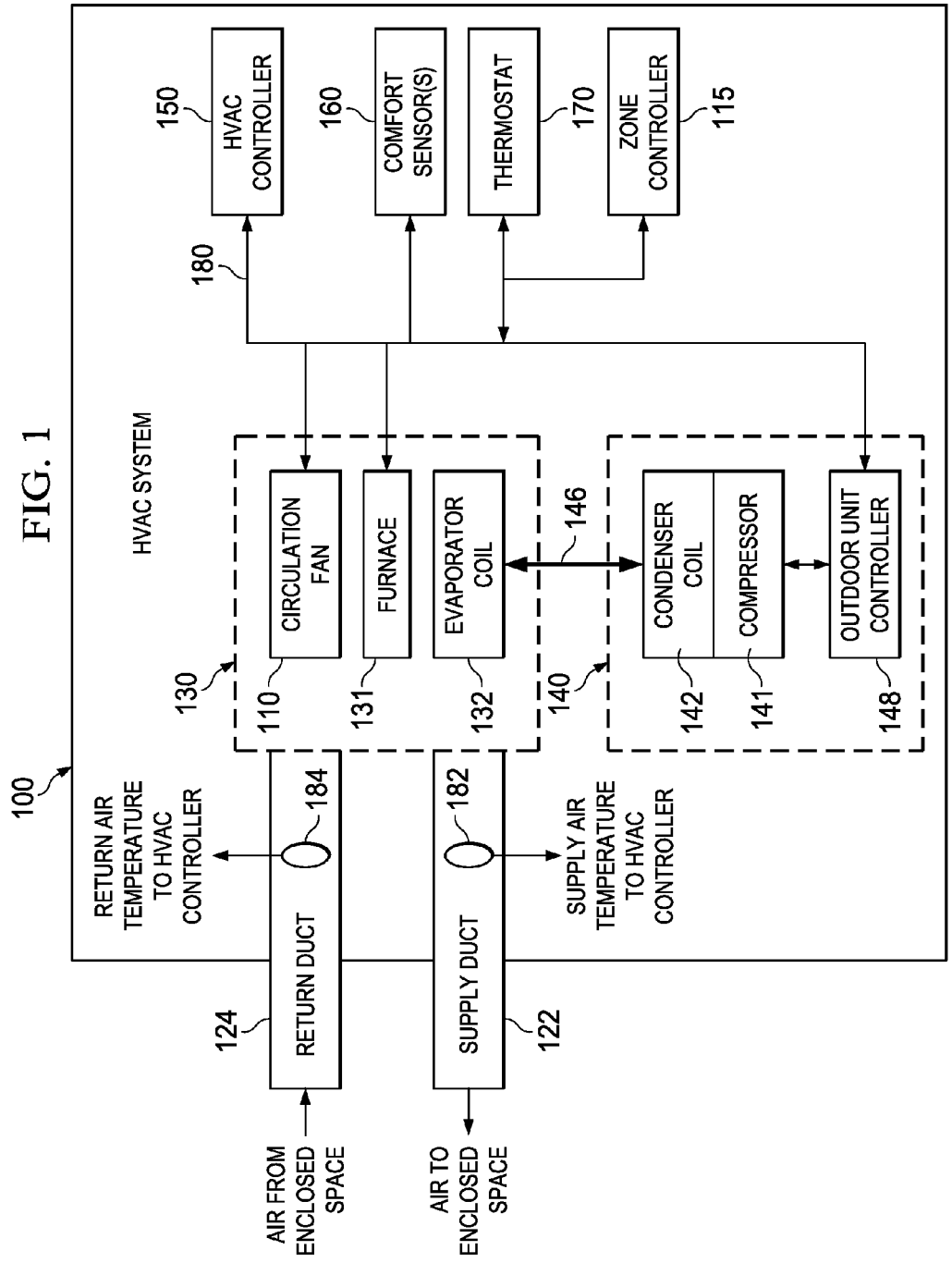
FIG. 1 illustrates a high-level block diagram of an embodiment of a HVAC system constructed according to the principles of the disclosure.

FIG. 1 illustrates a high-level block diagram of an embodiment of a HVAC system 100 constructed according to the principles of the disclosure. The HVAC system 100 is configured to condition air for an enclosed space, including cooling and heating. One skilled in the art will understand that the HVAC system could also include additional environmental conditioning components. For example, humidifiers or dehumidifiers may also be employed to increase or decrease humidity. The HVAC system 100 may also include other components and devices that are not presently illustrated or discussed but are typically included in an HVAC system.

The HVAC system 100 includes a circulation fan 110 to move conditioned air through the enclosed space or provide ventilation for the enclosed space. The HVAC system 100 is a zoned HVAC system and includes one or more electronic dampers (not illustrated) to control air flow through air ducts, including a supply air duct 122 and a return air duct 124, of the HVAC system 100. The one or more dampers are controlled by a zone controller 115. One skilled in the art will understand that the HVAC system 100 can include multiple circulation fans, ducts, zone controllers, etc.

The zone controller 115 is configured to manage conditioned air for designated zones of the enclosed space. A zone is a portion of a HVAC system that includes at least one conditioning unit and includes at least one user interface, such as a thermostat 170. As used herein, a conditioning unit is a cooling or heating unit that provides conditioned air for the HVAC system 100. The cooling unit or heating unit can be part of an indoor unit 130 that can be installed in, for example, a basement or attic of the enclosed space. For the HVAC system 100, the heating unit and the cooling unit are a furnace 131 and a refrigerant evaporator coil 132, respectively. The furnace 131 and the evaporator coil 132 are associated with the circulation fan 110 and included with the indoor unit 130.

The zone controller 115 operates electronic dampers to control air flow to zones of the enclosed space. As noted above, the zone controller 115 generates a blower control signal to request a blower volume for the circulation fan 110. In some embodiments, the zone controller 115 is configured to provide greater air flow to different zones to compensate for greater cooling load or air flow requirements. As such, the blower control signal requests a greater blower volume with respect to, for example, a cooling call or heating call for a first zone than a second zone. The zone controller 115 can be a conventional controller for delivering conditioned air to designated zones of an enclosed space. In one embodiment, the zone controller 190 can be a Harmony III™ Zone Controller. Though the HVAC system 100 is a zoned HVAC system, the functionality disclosed herein is not limited to a zoned HVAC system.

As noted above, the HVAC system 100 is configured to provide heating and cooling and therefore includes the furnace 131 and the evaporator coil 132, typically associated with the circulation fan 110. Such embodiment of the HVAC system 100 also includes a compressor 141 and associated condenser coil 142, which are typically associated in a so-called "outdoor unit" 140. The compressor 141 and associated condenser coil 142 are typically connected to the associated evaporator coil 132 by a refrigerant line 146. The outdoor unit 140 includes an outdoor unit controller 148 configured to direct the operation of the outdoor unit 140, such as changing the operating speed of the compressor 141. Although not shown in FIG. 1, the HVAC system 100 may include a heat pump in lieu of or in addition to furnace 131 and the compressor 141.

An HVAC controller 150 is configured to control the circulation fan 110, the furnace 131 and/or the compressor 141 to regulate the temperature of the enclosed space. The HVAC controller 150 may be an integrated controller or a distributed controller that directs operation of the HVAC system 100. The HVAC controller 150 may include an interface to receive thermostat calls and other operating data of the HVAC system 100, such as a blower control signal and information that indicates a temperature difference across a conditioning unit of the HVAC system 100. The HVAC controller 150 also includes a processor, such as a microprocessor, to direct the operation of the HVAC system 100. The HVAC controller 150 may include a memory section having a series of operating instructions stored therein that direct the operation of the HVAC controller 150 (e.g., the processor) when initiated thereby. The series of operating instructions may represent algorithms that are used to direct operation of the HVAC system 100 based on the temperature drop across a conditioning unit, such as, for example, determining blower volumes for the circulation fans 110 and operating speeds of the compressor 141 based on the temperature difference across the furnace 131 or the evaporator coil 132. In one embodiment, the algorithms can implement the method illustrated in FIG. 3 or at least a portion thereof.

The HVAC controller 150 can be a central HVAC controller. In some embodiments, at least a portion of the functionality of the HVAC controller 150 can be implemented in the thermostat 170. In one embodiment, the thermostat 170 includes the functionality of a conventional thermostat of an HVAC system such as generating thermostat calls for cooling based on temperature settings. Additionally, the thermostat 170 can include the necessary logic to direct the operation of the HVAC system 100 based on the temperature difference across a conditioning unit of the HVAC system 100.

The HVAC system 100 also includes one or more comfort sensors 160 associated with the HVAC controller 150. The one or more comfort sensors 160 provide environmental data, e.g., temperature and/or humidity, for various zones of the HVAC system 100 to the HVAC controller 150.

A data bus 180, which in the illustrated embodiment is a serial bus, couples various components of the HVAC system 100 for communication of control signals and data. The data bus 180 may be advantageously employed to convey one or more alarm messages, one or more diagnostic messages, feedback data, operating data, etc. of the HVAC system 100. A conventional cable and contacts may be used to couple the HVAC controller 150 to the various components. In some embodiments, a wireless connection may also be employed to provide at least some of the connections. The data bus 180 can also be a wired-connection.

In some embodiments, the circulation fan 110 can operate at different capacities, i.e., motor speeds, to circulate air through the HVAC system 100, whereby the circulated air is conditioned and supplied to the enclosed space. The circulation fan moves the air at a certain capacity according to the blower volume. Different blower volumes can correspond to various operating speeds of the compressor 141. The compressor 141 operates within a range from a minimum to a maximum capacity and the operating speed of the compressor is denoted as a percentage of the maximum operating capacity. The relationship between the blower volumes and the operating speeds can be represented by a non-linear curve.

The HVAC system 100 also includes a supply air temperature sensor 182 and a return air temperature sensor 184. The supply air temperature sensor 182 and the return air temperature sensor 184 can be conventional devices that are used to determine a temperature of air and are typically employed in HVAC systems. In some embodiments, one or both of the temperature sensors 182, 184, are thermistors. For example, the supply air temperature sensor 182 and the return air temperature sensor 184 can be 10 k thermistors in a stainless steel hermetic housing. In other embodiments, at least one of the temperature sensors 182, 184, can be a resistance temperature detector (RTD).

The supply air temperature sensor 182 and the return air temperature sensor 184 provide the supply air temperature and the return air temperature, respectively, to the HVAC controller 150. These two temperatures indicate the temperature difference across the conditioning units of the HVAC system and are used by the HVAC controller 150 to direct operation of the HVAC system 100. As such, depending on the operating mode of the HVAC system 100 the temperature difference is across the furnace 131 or the evaporator coil 132. The HVAC controller 150 can determine the temperature difference by subtracting the supply air temperature from the return air temperature. For heating, the HVAC controller 150 can determine a need to stage the furnace 131 based on a temperature rise across the furnace 131. In one embodiment, the HVAC controller 150 determines when to direct the compressor 141 to a higher operating stage or capacity based on the temperature drop across the evaporator coil 132. Thus, the HVAC controller 150, or processor thereof, can direct the compressor 141 to stage-up or not. Stage-up or staging-up as used herein is moving from a lower operating stage to a higher operating stage or increasing operating capacity. Considering a variable speed compressor, the compressor would increase operating capacity when moving from a first operating point to a second operating point.

Figure 2:
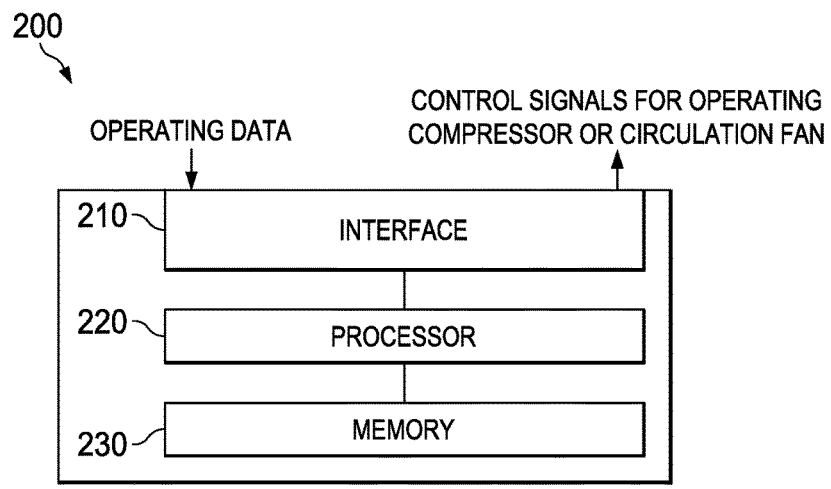
FIG. 2 illustrates a block diagram of an embodiment of a HVAC controller of an HVAC system constructed according to the principles of the disclosure.

In addition to making decisions regarding operating capacity, the HVAC controller 150 is configured to perform diagnostics for the HVAC system 100 and control blower volumes for the circulation fan 110. FIG. 2 and the corresponding discussion provide additional information about an HVAC controller that employs the temperature difference across the conditioning units for directing operation of an HVAC system.

FIG. 2 illustrates a block diagram of an embodiment of a HVAC controller 200 of an HVAC system constructed according to the principles of the disclosure. The HVAC controller 200 is configured to direct the operation of or at least part of the operation of an HVAC system, such as the HVAC system 100. As such, the HVAC controller 200 is configured to generate control signals that are transmitted to the various components to direct the operation thereof. The HVAC controller 200 may generate the control signals in response to feedback data and/or operating data that is received from various sensors and/or components of the HVAC system. For example, HVAC controller 200 can generate a control signal to operate a circulation fan of the HVAC system. The HVAC controller 200 includes an interface 210 that is configured to receive and transmit the feedback data, operating data, control signals and demand data. The operating data received by the interface 210 includes a blower control signal and a thermostat call. Additionally, the operating data includes temperature data indicating the temperature difference between supply air and return air. The interface 210 may be a conventional interface that is used to communicate (i.e., receive and transmit) data for a controller, such as a microcontroller.

The HVAC controller 200 also includes a processor 220 and a memory 230. The memory 230 may be a conventional memory typically located within a controller, such as a microcontroller, that is constructed to store data and computer programs. The memory 230 is configured to store operating instructions to direct the operation of the processor 220 when initiated thereby. The operating instructions may correspond to algorithms that provide the functionality of at least some of the operating schemes disclosed herein. For example, the operating instructions may correspond to the algorithm or algorithms that implement the method illustrated in FIG. 3.

The processor 220 may be a conventional processor such as a microprocessor. The interface 210, processor 220 and memory 230 may be coupled together via conventional means to communicate information. The HVAC controller 200 may also include additional components typically included within a controller of an HVAC system or unit, such as a power supply or power port. The processor 220 is configured to operate the HVAC system according to the feedback data, demand data and operating data, that includes supply air and return air temperature information, to provide conditioned air in response to received thermostat calls.

In one embodiment, the processor 220 is configured to initiate operation of the HVAC system in response to the thermostat call and control operation thereof based on the temperature difference across the evaporator coil of the HVAC system. In some embodiments, the processor 220 is configured to determine operating stages for the HVAC system based on the temperature difference. The processor 220 can also be further configured to control the blower volume of a circulation fan of the HVAC system based on the temperature difference and an operating speed of the compressor. For example, the circulation fan can be slowed to modify the temperature drop or rise depending on the desired outcome of the thermostat call. In some embodiments, the processor 220 can provide this functionality for HVAC systems that do not include a variable speed compressor. The processor 220 can similarly provide dehumidification for the HVAC system based on the temperature difference. Typically, larger temperature drops are beneficial for dehumidification and lower temperature drops are beneficial for efficiency.

In some embodiments, the processor 220 is further configured to perform diagnostics on the HVAC system by comparing the temperature difference and related operating data to historical data of the HVAC system stored on the memory 230. For example, the processor 220 can compare the present operating speed of the compressor for the present temperature difference of 15 degrees to historical data of compressor speed at a 15 degree temperature difference. If the present operating speed is at 80% and historical data is at 40%, then the processor 220 can generate an alarm indicating a potential problem. Thus, unlike conventional controllers, the HVAC controller 200 can advantageously employ the temperature drop across the conditioning units of an HVAC system to perform diagnostics in addition to more efficiently operating the HVAC system.

Figure 3:
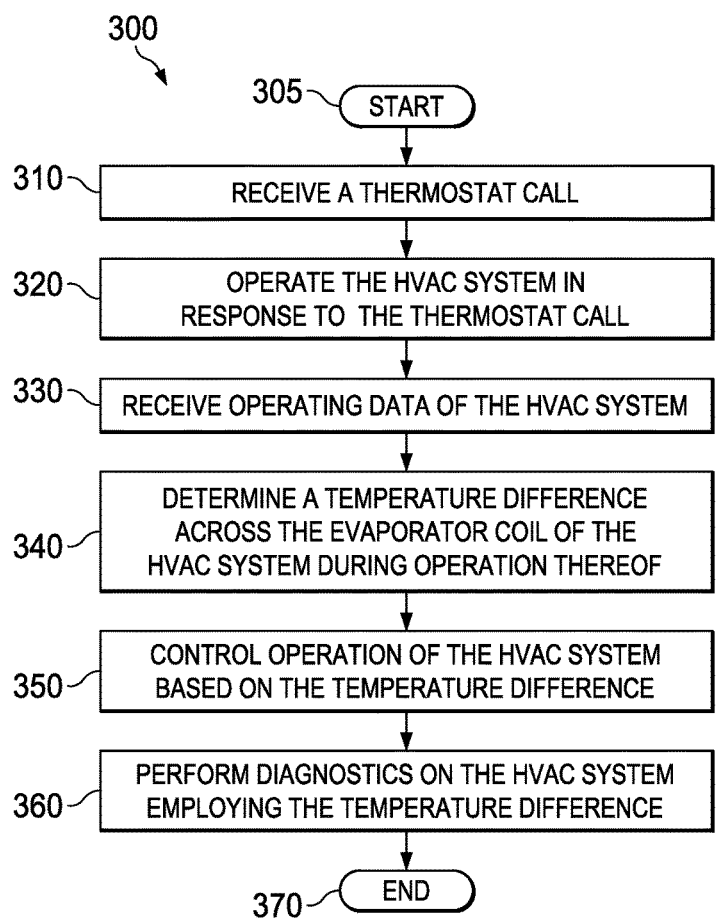
FIG. 3 illustrates a flow diagram of an embodiment of a method of operating an HVAC system carried out according to the principles of the disclosure.

FIG. 3 illustrates a flow diagram of an embodiment of a method 300 of operating an HVAC system carried out according to the principles of the disclosure. The HVAC controller 100 of FIG. 1 or the HVAC controller 200 of FIG. 2 may be used to perform the method 300. In one embodiment, the method is performed by a manufacturer or during manufacturing of a HVAC controller, unit or system. The method 300 begins in a step 305.

In a step 310, a thermostat call is received. The thermostat call can be a conventional request for a cooling demand or a heating demand of the HVAC system. The call can be received from a thermostat associated with a zone controller of the HVAC system.

In a step 320, the HVAC system is operated in response to the thermostat call. For conditioning demands, such as cooling or heating, an indoor unit of the HVAC system operates its circulation fan to move air across an evaporator coil or furnace to provide conditioned air through ducts to an enclosed space.

Operating data of the HVAC system is received in a step 330. The operating data includes information that indicates the temperature difference between the supply air and the return air. In one embodiment, the temperature information is a supply air temperature and a return air temperature.

In a step 340, a temperature difference across the evaporator coil is determined during said operation of the HVAC system. In one embodiment, an HVAC controller determines the temperature difference based on a supply air temperature and a return air temperature.

Operation of the HVAC system is controlled based on the temperature difference in a step 350. In some embodiments, controlling the operation of the HVAC system includes determining an operating stage of the HVAC system. In one embodiment, staging-up a compressor is determined based on the temperature difference. In another embodiment, changing the blower volume for a circulation fan is determined based on the temperature difference. In yet another embodiment determining to stage a furnace is based on a temperature rise across the furnace. For example, if the furnace is already operating at a maximum heating capacity, a decision to not stage-up can be made based on the temperature rise across the furnace.

In a step 360, diagnostics on the HVAC system is performed employing the temperature difference. The method 300 ends in a step 370.

The above-described methods may be embodied in or performed by various conventional digital data processors, microprocessors or computing devices, wherein these devices are programmed or store executable programs of sequences of software instructions to perform one or more of the steps of the methods, e.g., steps of the method of FIG. 3. The software instructions of such programs may be encoded in machine-executable form on conventional digital data storage media that is non-transitory, e.g., magnetic or optical disks, random-access memory (RAM), magnetic hard disks, flash memories, and/or read-only memory (ROM), to enable various types of digital data processors or computing devices to perform one, multiple or all of the steps of one or more of the above-described methods, e.g., one or more of the steps of the method of FIG. 3. Additionally, an apparatus, such as an HVAC controller, may be designed to include the necessary circuitry or programming to perform each step of a method disclosed herein.

Portions of disclosed embodiments may relate to computer storage products with a non-transitory computer-readable medium that have program code thereon for performing various computer-implemented operations that embody a part of an apparatus, system or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

What is claimed is:

1. A heating, ventilating and air conditioning (HVAC) controller of an HVAC system, comprising:
an interface configured to receive a thermostat call; and
a processor configured to initiate operation of said HVAC system in response to said thermostat call and control operation thereof based on a temperature difference across a conditioning unit of said HVAC system;
wherein the controller controls the operation of the HVAC system by:
determining, based on the temperature difference across the conditioning unit of said HVAC system, whether the HVAC system, operating at an original operating stage, is conditioning to its maximum capability;
operating, in response to determining that the HVAC system is not conditioning to its maximum capability, one or more components of the HVAC system at an adjusted operating stage; and
operating, in response to determining that the HVAC system is conditioning to its maximum capability, the one or more components of the HVAC system at the original operating stage.

2. The HVAC controller as recited in claim 1, wherein the temperature difference across the conditioning unit of said HVAC system is determined based on operating data that includes both a supply air temperature and a return air temperature of said HVAC system.

3. The HVAC controller as recited in claim 1, wherein:
said conditioning unit is an evaporator coil;
said one or more components comprises a variable-speed compressor; and
said processor is configured to determine an operating stage of said variable-speed compressor based on said temperature difference across said evaporator coil.

4. The HVAC controller as recited in claim 3, wherein:
said one or more components comprises a fan; and
said processor is further configured to control blower volume of the fan based on said temperature difference and an operating speed of said compressor.

5. The HVAC controller as recited in claim 1, wherein said conditioning unit is a multi-stage furnace and said processor is configured to determine an operating stage of said furnace based on said temperature difference.

6. The HVAC controller as recited in claim 1 further comprising a memory, wherein said processor is further configured to perform diagnostics on said HVAC system by comparing said temperature difference and related operating data to historical data of said HVAC system stored on said memory.

7. The HVAC controller as recited in claim 1 wherein said HVAC system is a zoned HVAC system having multiple operating stages and said processor is configured to control operating stages of said zoned HVAC system based on said temperature difference.

8. A method of operating a heating, ventilating and air conditioning (HVAC) system, comprising:
operating said HVAC system in response to a thermostat call;
determining a temperature difference across a conditioning unit of said HVAC system during said operating; and controlling said operating based on said temperature difference by:
  determining, based on the temperature difference across the conditioning unit of said HVAC system, whether the HVAC system, operating at an original operating stage, is conditioning to its maximum capability;
  operating, in response to determining that the HVAC system is not conditioning to its maximum capability, one or more components of the HVAC system at an adjusted operating stage; and
  operating, in response to determining that the HVAC system is conditioning to its maximum capability, the one or more components of the HVAC system at the original operating stage.

9. The method as recited in claim 8, further comprising receiving operating data of said HVAC system during said operating, wherein said temperature difference is determined from said operating data.

10. The method as recited in claim 9 wherein said operating data includes both a supply air temperature and a return air temperature of said HVAC system.

11. The method as recited in claim 8, wherein:
said conditioning unit is an evaporator coil;
said one or more components comprises a variable-speed compressor; and
said controlling includes determining an operating stage of said variable-speed compressor based on said temperature difference across said evaporator coil.

12. The method as recited in claim 8, wherein said controlling includes determining a blower volume for a circulation fan of said HVAC system based on said temperature difference and an operating stage of a compressor of said HVAC system.

13. The method as recited in claim 8 wherein said controlling includes determining an operating stage of a furnace of said HVAC system based on said temperature difference.

14. The method as recited in claim 8 further comprising performing diagnostics on said HVAC system employing said temperature difference.

15. An HVAC system, comprising:
at least one conditioning unit;
a circulation fan configured to move air across said conditioning unit; and
a controller configured to direct operation of said HVAC system, said controller including:
  an interface configured to receive a thermostat call; and
  a processor configured to initiate operation of said HVAC system in response to said thermostat call and control operation thereof based on a temperature difference across said conditioning unit, wherein the processor controls the operation of the HVAC system by:
    determining, based on the temperature difference across the conditioning unit of said HVAC system, whether the HVAC system, operating at an original operating stage, is conditioning to its maximum capability; and
    operating, in response to determining that the HVAC system is not conditioning to its maximum capability, one or more components of the HVAC system at an adjusted operating stage; and
    operating, in response to determining that the HVAC system is conditioning to its maximum capability, the one or more components of the HVAC system at the original operating stage.

16. The HVAC system as recited in claim 15 further comprising both a supply air temperature sensor and a return air temperature sensor configured to provide a supply air temperature and a return air temperature to said interface, wherein said processor determines said temperature difference based on said supply air temperature and said return air temperature.

17. The HVAC system as recited in claim 15, wherein said conditioning unit is an evaporator coil or a multi-stage furnace.

18. The HVAC system as recited in claim 15, further comprising a variable speed compressor, wherein said processor is further configured to determine a blower volume for operating said circulation fan based on said temperature difference and an operating stage of said compressor.

19. The HVAC system as recited in claim 15 further comprising a memory, wherein said processor is further configured to perform diagnostics on said HVAC system by comparing said temperature difference and related operating data to historical data of said HVAC system stored on said memory.

20. The HVAC system as recited in claim 15 wherein said HVAC system is a zoned HVAC system having multiple operating stages and said processor is configured to control operating stages of said zoned HVAC system based on said temperature difference.

* * * * *